(12) United States Patent
Hasegawa et al.

(10) Patent No.: US 7,100,645 B2
(45) Date of Patent: Sep. 5, 2006

(54) FILLER PIPE STRUCTURE

(75) Inventors: Yasuhiro Hasegawa, Wako (JP); Yukio Hirata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/051,915

(22) Filed: Feb. 7, 2005

(65) Prior Publication Data

US 2005/0236067 A1    Oct. 27, 2005

(30) Foreign Application Priority Data

Apr. 27, 2004  (JP)  ............... 2004-130586

(51) Int. Cl.
*B65B 1/04* (2006.01)
(52) U.S. Cl. .................. 141/301; 141/198; 141/302; 220/86.2
(58) Field of Classification Search ............. 141/192, 141/198, 285, 301, 302, 350, 351; 220/86.2; 137/588
See application file for complete search history.

(56) References Cited

U.S. PATENT DOCUMENTS

| | | | | |
|---|---|---|---|---|
| 3,938,564 A | * | 2/1976 | Jones | ............ 141/352 |
| 5,568,828 A | * | 10/1996 | Harris | ............ 141/348 |
| 5,660,206 A | * | 8/1997 | Neal et al. | ............ 137/592 |
| 6,000,426 A | * | 12/1999 | Tuckey et al. | ............ 137/588 |
| 6,257,287 B1 | * | 7/2001 | Kippe et al. | ............ 141/198 |
| 6,679,396 B1 | * | 1/2004 | Foltz et al. | ............ 220/86.2 |

FOREIGN PATENT DOCUMENTS

| | | | |
|---|---|---|---|
| DE | 19825725 A1 | * | 1/2000 |
| JP | 8-21317 | | 1/1996 |
| JP | 2000-85382 | | 3/2000 |

* cited by examiner

*Primary Examiner*—Timothy L. Maust
(74) *Attorney, Agent, or Firm*—Hamre, Schumann, Mueller & Larson, P.C.

(57) ABSTRACT

The present invention is related to a filler pipe structure for connecting a filler neck and fuel tank inside of a vehicle, and the filler pipe structure is equipped with a first filler pipe extending from the filler neck; a chamber that is arranged at an end to which the first filler pipe extends, and forms a space fronting the end of the first filler pipe; an inlet check valve attached to the end of the first filler pipe; and a second filler pipe that connects the space of the chamber and the fuel tank inside, wherein an inside section area of the second filler pipe is larger than that of the first filler pipe.

12 Claims, 4 Drawing Sheets

FILLER PIPE STRUCTURE

BACKGROUND OF THE INVENTION

1. Field of the Invention

The present invention relates to a filler pipe structure for connecting an fuel filler neck of a vehicle with a fuel tank inside thereof and for leading fuel supplied from the fuel filler neck by an oil filling gun and the like to the fuel tank inside, and particularly, to the filler pipe structure used in the vehicle (hereinafter referred to as "center tank vehicle") where the fuel tank is substantially arranged at a center of the vehicle.

2. Description of the Related Art

Conventionally, a center tank vehicle where a fuel tank is arranged below a front seat of the vehicle is known (for example, see paragraph 0024 and FIG. 1 of Japanese Patent Laid-Open Publication No. 2000-85382). Such the center tank vehicle can ensure a rear compartment of the vehicle larger, compared to a vehicle where a fuel tank is arranged at rear.

On the other hand, nowadays a vehicle with an ORVR (Onboard Refueling Vapor Recovery) appears (for example, see paragraphs 0018 to 0020 and FIG. 1 of Japanese Patent Laid-Open Publication Hei 8-21317). The ORVR is something for preventing a fuel evaporation gas generated within a fuel tank from being dispersed in the atmosphere through a filler neck when fuel is filled in the fuel tank. As such the ORVR, for example, can be cited one configured of a fuel evaporation gas reflux pipe for connecting a fuel tank inside and a filler pipe in a vicinity of a filler neck, another one where a canister where an adsorbent for adsorbing a fuel evaporation gas is housed is attached to a fuel tank through a communicating pipe, and the like. Out of these, when supplying fuel from the filler neck, the one configured of the fuel evaporation gas reflux pipe is designed to reduce an evaporating amount of fuel in the air sucked together with the fuel from the filler neck by refluxing a saturated fuel evaporation gas generated in the fuel tank via a route of the fuel evaporation gas reflux pipe, filler pipe, and fuel tank. In addition, the another one where the canister is attached to the fuel tank is designed to capture the fuel evaporation gas led from the fuel tank through the communication pipe by the adsorbent.

In this connection, because in the center tank vehicle a distance from the filler neck arranged at rear of the vehicle body to the fuel tank becomes longer, a filler pipe for connecting the fuel tank inside and the filler neck becomes longer. As a result, an oil filling resistance of the filler pipe augments in filling oil.

In addition, in a vehicle equipped with the ORVR a fuel evaporation gas within the fuel tank is sent into the fuel evaporation gas reflux pipe or the fuel evaporation gas is sent into the canister by using a head difference of the fuel filled in the filler pipe from the filler neck. As a result, in the vehicle equipped with the ORVR the oil filling resistance of the filler pipe augments in filling oil.

Accordingly, attempting to equip the ORVR with a center tank vehicle, it is foreseen that the oil filling resistance of the filler pipe markedly augments in filling oil. As a result, there is a possibility that a smooth oil filling is prevented.

Consequently, in order to solve such the problem can be thought a fuel tank structure that is designed to protrude a part of a rear end of the fuel tank toward a rear so that a plan view shape thereof becomes a convex shape, and to connect the filler pipe to the protruded part. In accordance with such the fuel tank structure, because the filler pipe for connecting the fuel tank inside and the filler neck is shortened, it is expected that the oil filling resistance of the filler pipe is reduced in filling oil, and that a smooth oil filling results in being realized. However, because in the fuel tank structure the shape of the fuel tank becomes complicated, it is foreseen that a yield of the fuel tank obtained worsens.

Consequently, a filler pipe structure is strongly requested that can realize a smooth oil filling even in a center tank vehicle equipped with the ORVR using a usual fuel tank of a good yield.

SUMMARY OF THE INVENTION

The inventor has reached the present invention based on knowledge that the above problem can be solved by generally arranging an inlet check valve, which is attached to an opening at a fuel tank side of a filler pipe, at an upstream side of a fuel passage from a filler neck to a fuel tank, and by reducing a pressure loss of a fuel passage from the inlet check valve to the fuel tank.

A first aspect of a filler pipe structure of the present invention to solve the problem is that the filler pipe structure connects a filler neck and fuel tank inside of a vehicle and comprises a first filler pipe extending from the filler neck; a chamber that is arranged at an end to which the first filler pipe extends, and forms a space fronting the end of the first filler pipe; an inlet check valve attached to the end of the first filler pipe; and a second filler pipe that connects the space of the chamber and the fuel tank inside, and an inside section area of the second filler pipe is larger than that of the first filler pipe. Meanwhile, here "the inside section area" means an area of a section being orthogonal in a fuel passing direction of a fuel passing portion in each of the first filler pipe and the second filler pipe.

In the filler pipe structure, fuel from the filler neck is filled in the fuel tank via the first filler pipe, inlet check valve, chamber, and second filler pipe. At this time, in the filler pipe structure of the present invention, because the inside section area of the second filler pipe is designed to be larger than that of the first filler pipe, the pressure loss of the fuel passage from the inlet check valve to the fuel tank is reduced. As a result, in the filler pipe structure the second filler pipe takes charge of a function similar to a protruded portion in a fuel tank structure, whose plan view shape is a convex shape as described before; and the first filler pipe takes charge of a function similar to the filler pipe in the fuel tank structure.

In other words, in accordance with the filler pipe structure of the present invention, even in a center tank vehicle equipped with the ORVR using a usual fuel tank of a good yield, a smooth oil filling can be realized without using a fuel tank having a complicated shape like the fuel tank structure.

A second aspect of the present invention is, in the first aspect of a filler pipe structure, that the filler pipe structure is formed in any manner that: the first filler pipe and the chamber are mutually integrated; the chamber and the second filler pipe are mutually integrated; and the first filler pipe, the chamber, and the second filler pipe are mutually integrated.

Because the filler pipe structure is formed in any manner that the first filler pipe and the chamber are mutually integrated; the chamber and the second filler pipe are mutually integrated; and the first filler pipe, the chamber, and the second filler pipe are mutually integrated, a prevention of a fuel leak in a fuel passage configured of the first filler pipe, the chamber, and the second filler pipe becomes surer.

A third aspect of the present invention is, in any of the first and second aspects of a filler pipe structure, that an inside section area of the second filler pipe is set 1.1 to 4 times that of the first filler pipe, the chamber is cylindrical, and an inside section area of the chamber is set 1.1 to 4 times that of the second filler pipe. Meanwhile, here "the inside section area of the chamber" means an area of a section being orthogonal in a fuel passing direction of a fuel passing portion in the chamber.

In accordance with such the filler pipe structure, because an oil filling resistance is efficiently reduced, a fuel supply from a filler neck is performed more smoothly.

BRIEF DESCRIPTION OF THE DRAWINGS

FIG. 4A is a section drawing taken along a line A—A in FIG. 3; and FIG. 4B is a section drawing taken along a line B—B in FIG. 4A.

DESCRIPTION OF THE PREFERRED EMBODIMENTS

Next will be described an embodiment of the present invention in detail, referring to drawings as needed. Here will be described an example of a filler pipe structure of the present invention applied to a center tank vehicle equipped with the ORVR (Onboard Refueling Vapor Recovery).

Firstly will be described a vehicle equipped with the filler pipe structure, preceding a description of the filler pipe structure related to the embodiment.

[Vehicle]

Figure 1:
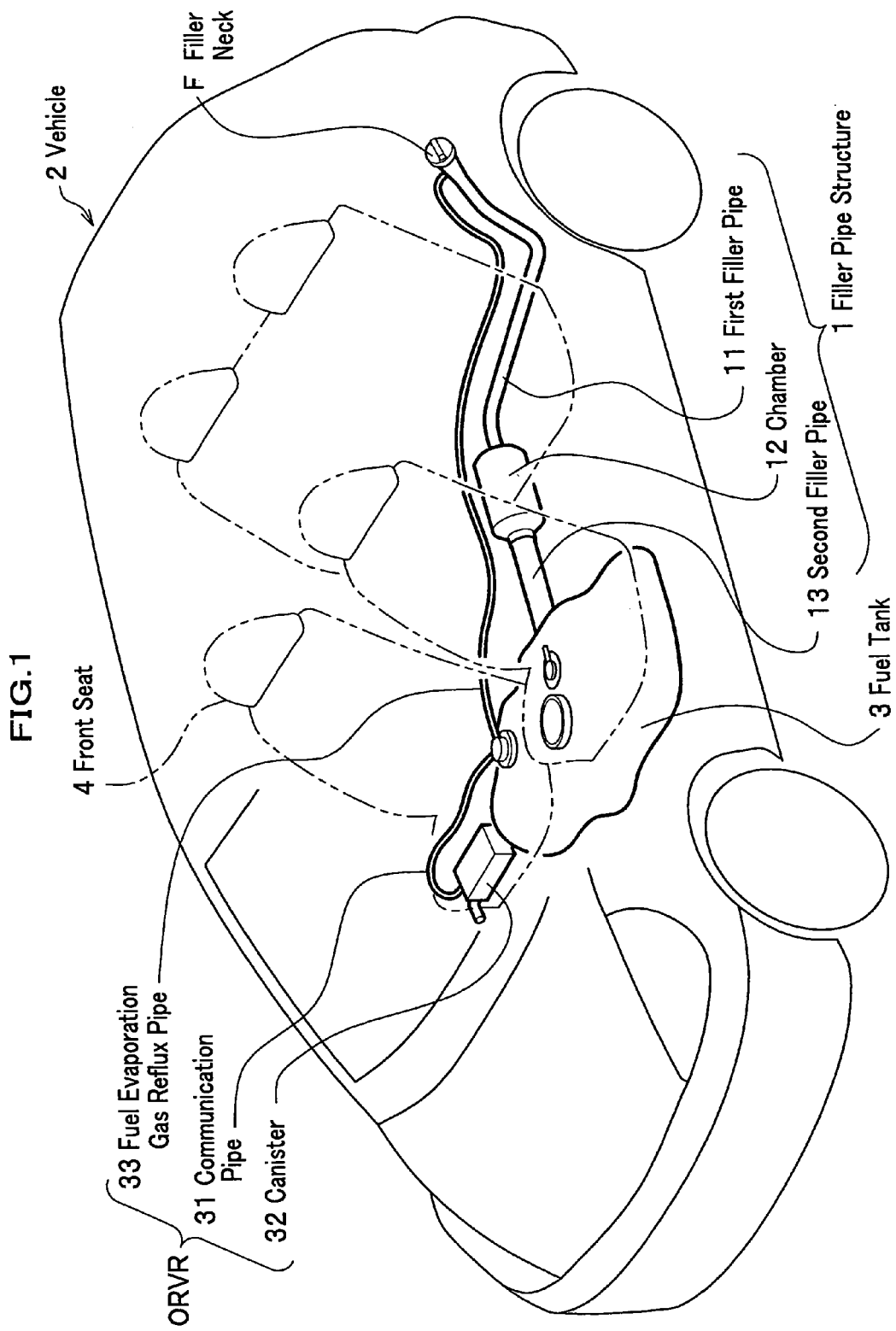
FIG. 1 is a perspective view showing a condition of a fuel tank, where a filler pipe structure related to an embodiment of the present invention is attached, being mounted on a vehicle.
Figure 2:
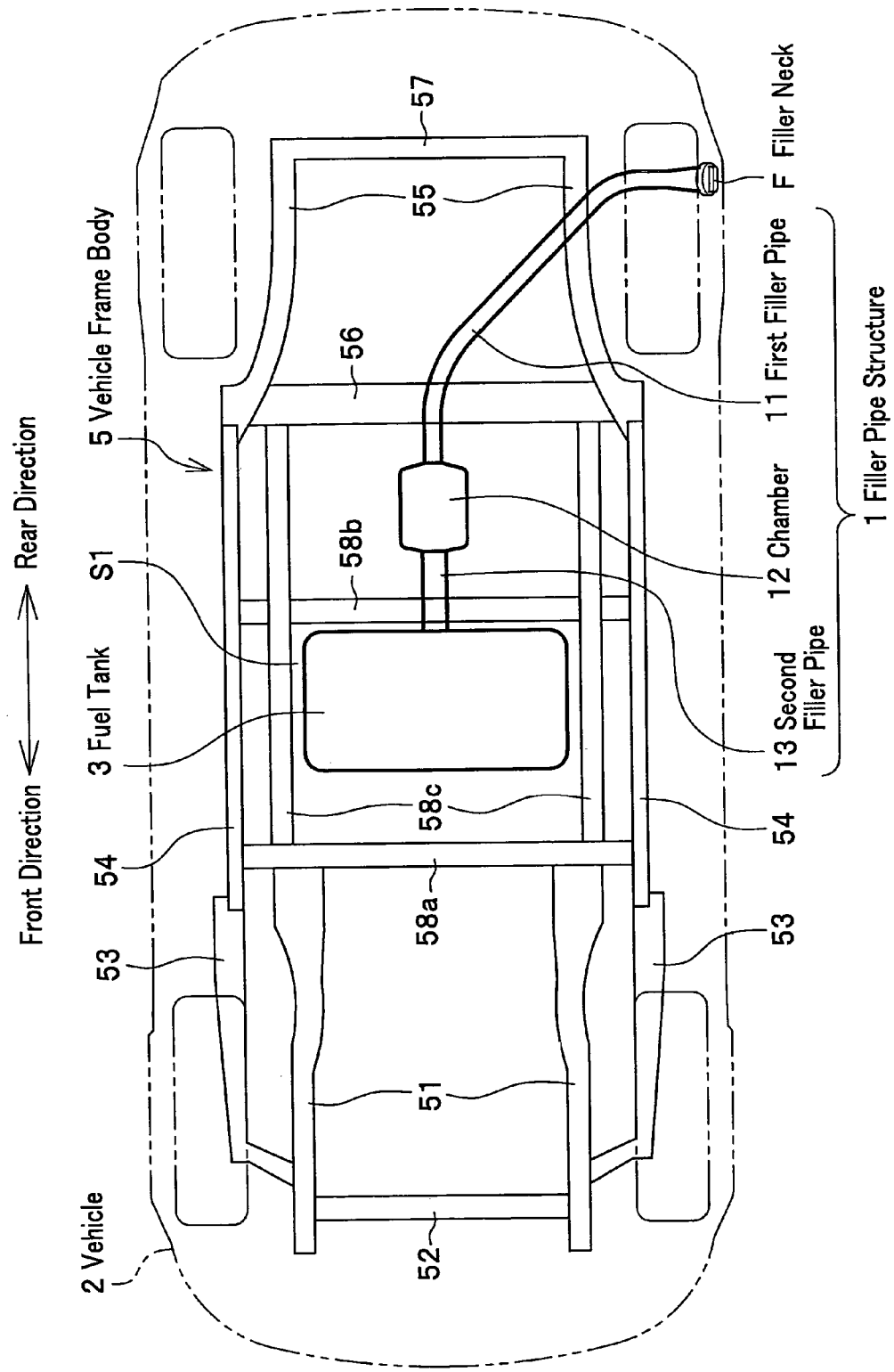
FIG. 2 is a conceptual drawing showing an arrangement position of a filler pipe structure related to an embodiment of the present invention and is a drawing showing a relative positional relationship with a vehicle body frame.

As shown in FIG. 1, a vehicle 2 equipped with a filler pipe structure 1 is a so called center tank vehicle where a fuel tank 3 is arranged below a front seat 4. An arrangement position of the fuel tank 3 of the vehicle 2 is in a positional relationship with a vehicle body frame 5 as follows:

Firstly describing the vehicle body frame 5 of the vehicle 2, as shown in FIG. 2, the vehicle body frame 5 is mainly configured of front side frames 51 arranged so as to extend in front/rear directions of the vehicle 2 at both sides of a front portion of the vehicle 2, a front cross member 52 hanged across the front side frames 51 at both sides thereof, upper members 53 arranged at outer sides of the vehicle 2 for the front side frames 51, side sills 54 extending in the rear direction of the vehicle 2 from rear ends of the upper members 53, rear side frames 55 extending in the rear direction of the vehicle 2 from rear ends of the side sills 54, a middle cross member 56 hanged across the rear ends of the side sills 54 at both sides thereof, and a rear cross member 57 hanged across rear ends of the rear side frames 55 at both sides thereof.

In addition, the vehicle 2 in the embodiment comprises reinforcement frames 58a and 58b hanged across the side sills 54 at both sides thereof and a pair of reinforcement frames 58c hanged across each rear end of the front side frames 51 and the middle cross member 56. These reinforcement frames 58a, 58b, and 58c are mutually assembled like a rectangle with its four corners protruded and are designed to reinforce a not shown floor panel arranged above these.

And the fuel tank 3 is arranged below the front seat 4 as described before, and is arranged in a space S1 surrounded by the reinforcement frames 58a, 58b, and 58c thus assembled under the floor panel not shown. The vehicle 2 (center tank vehicle) where such the fuel tank 3 is arranged can ensure a rear compartment larger, compared to a vehicle whose fuel tank is arranged at rear of the vehicle.

In addition, the vehicle 2 is equipped with the ORVR. The ORVR may be a known structure. The vehicle 2 in the embodiment is mainly configured, as shown in FIG. 1, of a canister 32 connected to the fuel tank 3 through a communication pipe 31 and a fuel evaporation gas reflux pipe 33 branched from the communication pipe 31 and connected to a first filler pipe 11, which is described later, in a vicinity of a filler neck F.

In the canister 32 is housed an adsorbent for adsorbing a fuel evaporation gas. The canister 32 is designed to capture the fuel evaporation gas flowing therein from the fuel tank 3 through the communication pipe 31 by a head difference of fuel filled in the filler pipe structure 1 related to the embodiment from the filler neck F described later.

A fuel evaporation gas within the fuel tank 3 is designed to flow in the fuel evaporation gas reflux pipe 33 by a head difference of fuel filled in the filler pipe structure 1 related to the embodiment from the filler neck F described later. And the fuel evaporation gas flowing in the fuel evaporation gas reflux pipe 33 flows in the filler pipe structure 1 in a vicinity of the filler neck F, is sucked in fuel supplied from the filler neck F, and is returned to the fuel tank 3 through the filler pipe structure 1. In other words, when the fuel is supplied from the filler neck F, the fuel evaporation gas within the fuel tank 3 is refluxed via a route of the fuel evaporation gas reflux pipe 33, filler pipe structure 1, and fuel tank 3. Thus, when being refluxed, the fuel evaporation gas toward the vicinity of the filler neck F via the fuel evaporation gas reflux pipe 33 from the fuel tank 3 is substantially saturated with a fuel composition. As a result, the fuel composition hardly transfers the fuel evaporation gas contacting the fuel in the vicinity of the filler neck F. On the other hand, because the fuel evaporation gas is supplied in the vicinity of the filler neck F, an air amount sucked in the fuel in the vicinity of the filler neck F is reduced. As a result, an amount of fuel evaporating in the air within the fuel tank 3 is reduce, compared to a case of the fuel being not supplied in the vicinity of the filler neck F.

Meanwhile, in such the ORVR, at the communication pipe 31 and the fuel evaporation gas reflux pipe 33 may also be arranged a known pressure adjustment valve (not shown) for adjusting a flow rate of a fuel evaporation gas that is distributed to each of the communication pipe 31 and the fuel evaporation gas reflux pipe 33 from the fuel tank 3, depending on a flow rate of fuel supplied from the filler neck F.

Next will be described the filler pipe structure 1 related to the embodiment.

[Filler Pipe Structure]

As shown in FIG. 1, the filler pipe structure 1 configures a fuel passage from the filler neck F to the inside of the fuel tank 3 and connects them. The filler pipe structure 1 comprises the first filler pipe 11, a chamber 12, a second filler pipe 13, and an inlet check valve 14 (see FIG. 3) described later.

The first filler pipe 11 extends once downward from the filler neck F arranged at rear of the vehicle 2 and then extends to the fuel tank 3 at a substantially same horizontal height as an arrangement position of the fuel tank 3. Thus a head difference of fuel transportation force is obtained by the first filler pipe 11 extending to the fuel tank 3 when sending fuel to the fuel tank 3 from the filler neck F.

An inner diameter of such the first filler pipe 11 can be appropriately set, depending on a maximum flow rate of the fuel supplied from the filler neck F. A material of the first filler pipe 11 is not specifically limited, and a same material as one used in a conventional filler pipe can be used.

Figure 3:
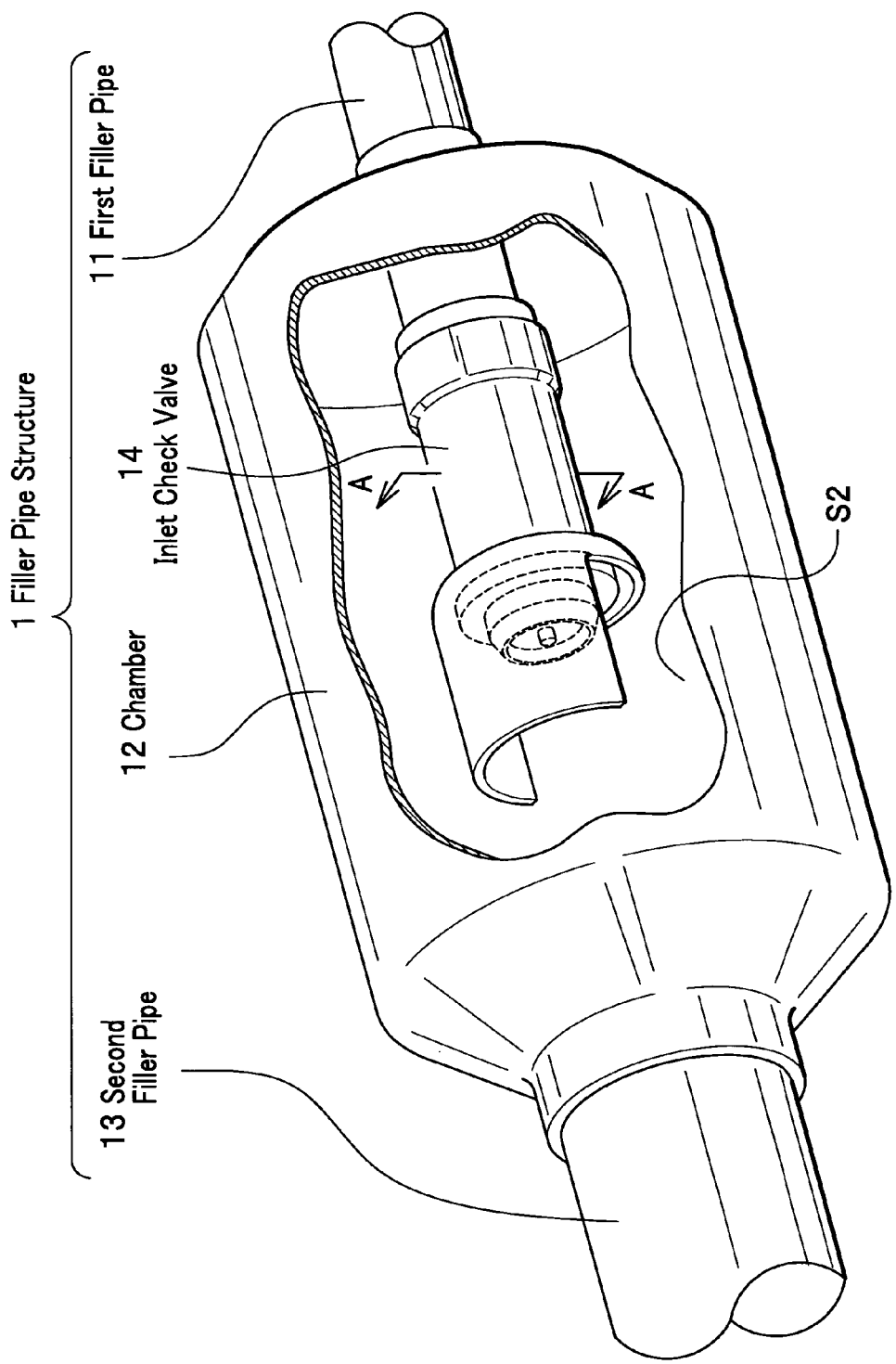
FIG. 3 is a perspective view of a chamber for configuring a filler pipe structure related to an embodiment of the present invention and is a drawing including an exploded portion in a part thereof.

As shown in FIG. 1, the chamber 12 is arranged at an end, where the first filler pipe 11 extends, and is connected so as to be integrated with the first filler pipe 11. As shown in FIG. 3, the chamber 12 is cylindrical, and therein is formed a space S2 where the end of the first filler pipe 11 fronts. Because in the embodiment a rear suspension is arranged at more rear of the vehicle 2 than the middle cross member 56 (see FIG. 2) configuring the vehicle body frame 5, the chamber 12 is positioned more forward than the middle cross member 56.

An inner section area of such the chamber 12 is set to be larger, compared to that of the second filler pipe 13. Meanwhile, here "the inner section area" means an area of a section being orthogonal in a fuel passing direction of a fuel passing portion in each of the chamber 12 and the second filler pipe 13. In the embodiment the inside section area of the chamber 12 is set 1.1 to 4 times that of the second filler pipe 13.

As a material of the chamber 12 can be cited, for example, a resin such as polyacetal, polyethylene, and polyamide (nylon); and a metal such as steel and stainless steel.

As shown in FIG. 3, the second filler pipe 13 is connected so as to be integrated with the chamber 12, and an opening at a base end of the pipe 13 fronts the space S2 of the chamber 12. And as shown in FIG. 1, the second filler pipe 13 extends to the fuel tank 3 from the chamber 12, is connected to the fuel tank 3, and connects the space S2 (see FIG. 3) within the chamber 12 and the inside of the fuel tank 3 by an end of the second filler pipe 13 opening within the fuel tank 3.

An inner section area of such the second filler pipe 13 is set to be larger, compared to that of the first filler pipe 11. Meanwhile, here "the inner section area" of the first filler pipe 11 means an area of a section being orthogonal in the fuel passing direction of a fuel passing portion in the first filler pipe 11. In the embodiment the inside section area of the second filler pipe 13 is set 1.1 to 4 times that of the first filler pipe 11.

A material of the second filler pipe 13 is not specifically limited, and a same material as one used in a conventional filler pipe can be used.

As shown in FIG. 3, the inlet check valve 14 is attached to an end of the first filler pipe 11 fronting the space S2 of the chamber 12. The inlet check valve 14 prevents fuel flowing in the chamber 12 from flowing back to the first filler pipe 11.

Figures 4A, 4B:
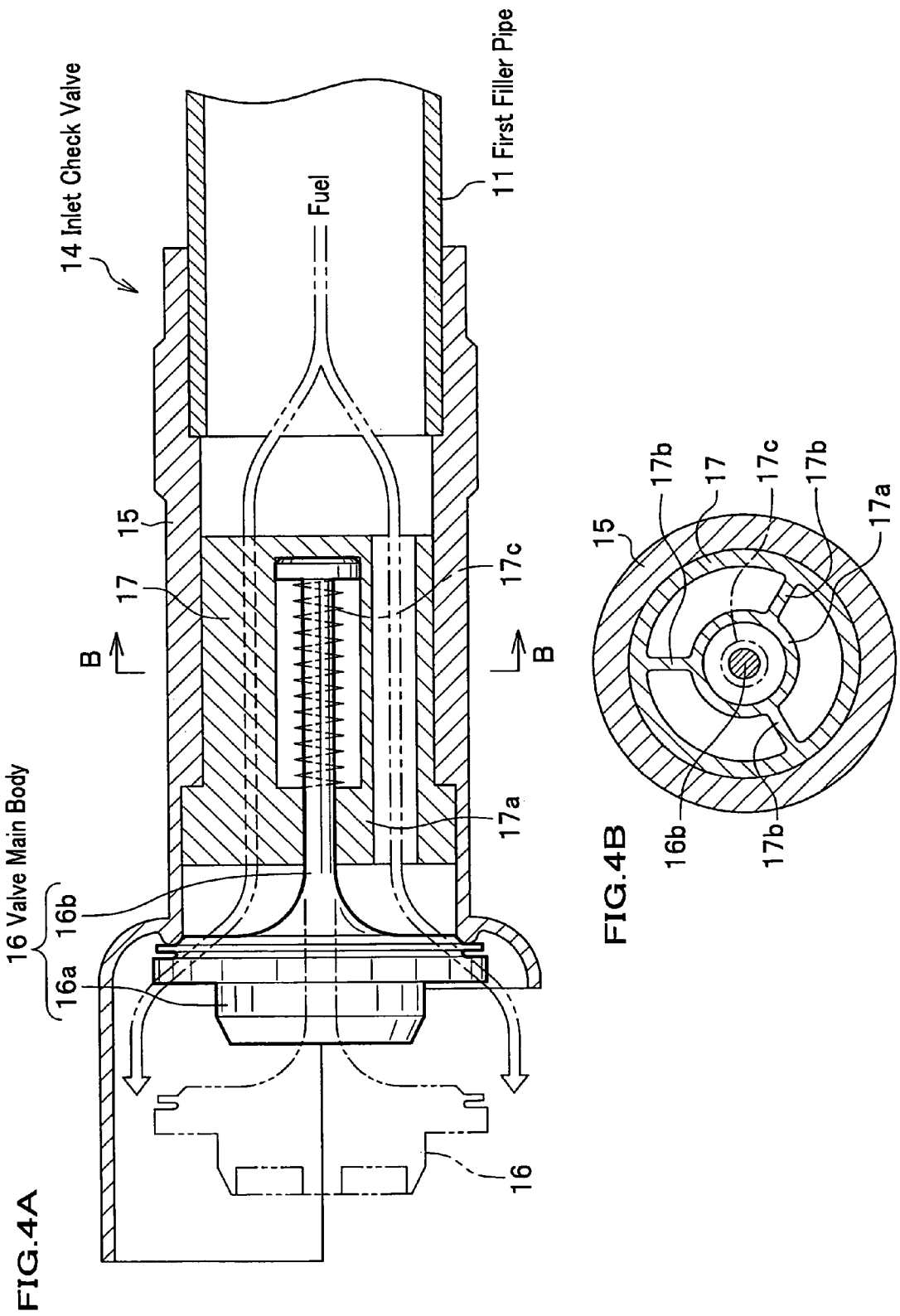
FIGS. 4A and 4B are drawings of an inlet check valve for configuring a filler pipe structure related to an embodiment of the present invention.

As shown in FIG. 4A, the inlet check valve 14 is mainly configured of a casing 15, a valve main body 16, and a support member 17 for supporting the valve main body 16 within the casing 15.

The casing 15 is substantially cylindrical, and the end of the first filler pipe 11 is designed to be connected to a rear end of the casing 15. An opening of an end of the casing 15 is designed to be stopped by a head 16a of the valve main body 16.

The valve main body 16 comprises the head 16a substantially like a disc and a shaft 16b provided on a center axis of the head 16a. The valve main body 16 is arranged so that the head 16a stops the opening of the casing 15, and is supported by the support member 17 so that the shaft 16b is arranged on a center axis of the casing 15.

As shown in FIGS. 4A and 4B, the support member 17 is formed of a substantially cylindrical member fitted in the casing 15, and on the center axis thereof is arranged a tubular portion 17a for supporting the shaft 16b of the valve main body 16. Inside the tubular portion 17a are provided, as shown in FIG. 4B, three support plates 17b radially extending to an inner peripheral wall of the support member 17 from the tubular portion 17a in order to connect the inner peripheral wall of the support member 17 and the tubular portion 17a. Inside the tubular portion 17a are provided a spring 17c for energizing the valve main body 16 to the rear end of the casing 15. It is preferable that in the spring 17c energizing force thereof is feeble and a pressure loss becomes minimum, when fuel flows in the chamber 12 from the first filler pipe 11 as described later.

Next will be described an operation of the filler pipe structure 1, referring to drawings as needed. Because the valve main body 16 is energized to the rear end of the casing 15 by the spring 17c before a supply of fuel from the filler neck F as shown in FIG. 4A, the head 16a of the valve main body 16 stops the opening of the front end of the casing 15. As a result, fuel remaining in the space S2 (see FIG. 3) of the chamber 12 does not flow back to the first filler pipe 11.

Next, if fuel is filled in the first filler pipe 11 from the filler neck F, the filled fuel makes for the chamber 12 via the first filler pipe 11 by a head difference thereof. And as shown in FIG. 4A, the fuel passes through the inside of the casing 15 of the inlet check valve 14 attached to the end of the first filler pipe 11 and pushes forward the head 16a of the valve main body 16 by the head difference, resisting the energizing force of the spring 17c. As a result, in FIG. 4A the valve main body 16 moves to a position of the valve main body 16 shown in chain double-dashed lines, and thereby the fuel flows in the space S2 (see FIG. 3) of the chamber 12.

Next, the fuel, which flows in the space S2 (see FIG. 3) of the chamber 12, flows in the second filler pipe 13. And the fuel makes for the fuel tank 3 via the second filler pipe 13.

Thus, because when the fuel makes for the fuel tank 3 via the first filler pipe 11 and the second filler pipe 13, an inner diameter of the second filler pipe 13 becomes larger than that of the first filler pipe 11, a pressure loss of the fuel passage from the inlet check valve 14 (see FIG. 3) to the fuel tank 3 (see FIG. 1) is reduced. As a result, in the filler pipe structure 1 the second filler pipe 13 takes charge of the function similar to a protruded portion in a fuel tank structure with a convex shape of the plan view shape described before; and the first filler pipe 11 takes charge of the function similar to the filler pipe in the fuel tank structure. In other words, the filler pipe structure 1 reduces an oil filling resistance in filling oil same as a case of a conventional filler pipe being shortened.

In accordance with the filler pipe structure 1 thus described, even because a center tank vehicle having a long distance from the filler neck F to the fuel tank 3 can reduce the oil filling resistance in filling oil, a smooth oil filling can be realized.

In addition, in accordance with the filler pipe structure 1, because even a vehicle equipped with the ORVR augmenting the oil filling resistance can reduce the oil filling resistance in filling oil, a smooth oil filling can be realized.

In addition, in accordance with the filler pipe structure 1, because the oil filling resistance can be reduced in filling oil, a usual fuel tank with a good yield can be used without using a fuel tank having a complicated shape such as the fuel tank structure even in a center tank vehicle equipped with the ORVR.

Thus, although the embodiment of the present invention is described, the invention is not limited thereto. For example, although in the embodiment is described an example of applying the filler pipe structure 1 to a center tank vehicle equipped with the ORVR, the filler pipe structure 1 of the present invention may be applied to a vehicle not equipped with the ORVR, or to a vehicle whose fuel tank is arranged at rear.

In addition, although in the embodiment the chamber 12 with the space S2 of a circular section shape (cylindrical object) is used, the present invention is not limited thereto, and, for example, a section shape of the space S2 may be any of an elliptic and a polygon such as a rectangle.

In addition, although in the embodiment the first filler pipe 11, the chamber 12, and the second filler pipe 13 are formed so as to mutually be integrated, the present invention may be formed so that only the first filler pipe 11 and the chamber 12 are mutually integrated, and so that only the first filler pipe 11 and the second filler pipe 13 are mutually integrated.

What is claimed is:

1. A filler pipe structure for connecting a filler neck and a centrally located fuel tank of a center tank vehicle, the structure comprising:
    a first filler pipe extending from said filler neck;
    a chamber that is arranged at an end to which said first filler pipe extends, and forms a space fronting the end of said first filler pipe;
    an inlet check valve attached to the end of said first filler pipe and configured to be actuatable to an open position by fuel introduced through said filler neck into said first filler pipe and to prevent fuel from flowing back into said first filler pipe; and
    a second filler pipe that connects the space of said chamber and an inside of said fuel tank,
    wherein an inside section area of said second filler pipe is larger than that of said first filler pipe.

2. A filler pipe structure according to claim 1, wherein the end of said first filler pipe is disposed within the space formed by the chamber, and the space surrounds the end of said first filler pipe and the inlet check valve.

3. A filler pipe structure according to claim 1, wherein an inside section area of said second filler pipe is set 1.1 to 4 times that of said first filler pipe, said chamber is cylindrical, and an inside section area of said chamber is set 1.1 to 4 times that of said second filler pipe.

4. A filler pipe structure according to claim 2, wherein an inside section area of said second filler pipe is set 1.1 to 4 times that of said first filler pipe, said chamber is cylindrical, and an inside section area of said chamber is set 1.1 to 4 times that of said second filler pipe.

5. A filler pipe structure for connecting a filler neck and fuel tank of a vehicle, the structure comprising:
    a first filler pipe extending from said filler neck to an end disposed at approximately the same vertical height as the fuel tank;
    a chamber that is arranged at the end of said first filler pipe, the chamber forming a space fronting the end of said first filler pipe;
    an inlet check valve attached to the end of said first filler pipe; and
    a second filler pipe that connects the space of said chamber and an interior of said fuel tank,
    wherein an inside section area of said second filler pipe is larger than that of said first filler pipe.

6. A filler pipe structure according to claim 5, wherein the end of said first filler pipe is disposed within the space formed by the chamber, and the space surrounds the end of said first filler pipe and the inlet check valve.

7. A filler pipe structure according to claim 5, wherein an inside section area of said second filler pipe is set 1.1 to 4 times that of said first filler pipe, said chamber is cylindrical, and an inside section area of said chamber is set 1.1 to 4 times that of said second filler pipe.

8. A filler pipe structure according to claim 6, wherein an inside section area of said second filler pipe is set 1.1 to 4 times that of said first filler pipe, said chamber is cylindrical, and an inside section area of said chamber is set 1.1 to 4 times that of said second filler pipe.

9. A filler pipe structure for connecting a filler neck and fuel tank of a vehicle, the structure comprising:
    a first filler pipe extending from said filler neck;
    a chamber that is arranged at an end of said first filler pipe, the chamber forming a space fronting the end of said first filler pipe;
    an inlet check valve connected to the end of said first filler pipe; and
    a second filler pipe that connects the space of said chamber and an interior of said fuel tank,
    wherein an inside section area of said second filler pipe is larger than that of said first filler pipe, and an inside section area of said chamber is larger than the inside section area of said second filler pipe and the inside section area of said first filler pipe.

10. A filler pipe structure according to claim 9, wherein the end of said first filler pipe is disposed within the space formed by the chamber, and the space surrounds the end of said first filler pipe and the inlet check valve.

11. A filler pipe structure according to claim 9, wherein an inside section area of said second filler pipe is set 1.1 to 4 times that of said first filler pipe, said chamber is cylindrical, and an inside section area of said chamber is set 1.1 to 4 times that of said second filler pipe.

12. A filler pipe structure according to claim 10, wherein an inside section area of said second filler pipe is set 1.1 to 4 times that of said first filler pipe, said chamber is cylindrical, and an inside section area of said chamber is set 1.1 to 4 times that of said second filler pipe.

* * * * *